(12) United States Patent
Galloway et al.

(10) Patent No.: US 12,270,913 B1
(45) Date of Patent: *Apr. 8, 2025

(54) LIDAR SENSOR SYSTEM USING PARTICULAR SCANNING METHODS

(71) Applicant: Aurora Operations, Inc., Mountain View, CA (US)

(72) Inventors: Ryan Moore Galloway, Bozeman, MT (US); Duncan E. Luth, Bozeman, MT (US); Chad F. Mitchell, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 319 days.

This patent is subject to a terminal disclaimer.

(21) Appl. No.: 17/948,934

(22) Filed: Sep. 20, 2022

(51) Int. Cl.
*B60W 30/09* (2012.01)
*B60W 60/00* (2020.01)
*G01S 7/48* (2006.01)
*G01S 7/481* (2006.01)
*G01S 17/58* (2006.01)
*G01S 17/931* (2020.01)

(52) U.S. Cl.
CPC ......... *G01S 17/931* (2020.01); *B60W 30/09* (2013.01); *B60W 60/0016* (2020.02); *B60W 60/0017* (2020.02); *G01S 7/4808* (2013.01); *G01S 7/4811* (2013.01); *G01S 7/4817* (2013.01); *G01S 17/58* (2013.01); *B60W 2300/125* (2013.01); *B60W 2420/408* (2024.01); *B60W 2554/4042* (2020.02); *B60W 2554/802* (2020.02)

(58) Field of Classification Search
CPC ...... G01S 7/4808; G01S 7/4813; G01S 17/34; G01S 17/32; G01S 7/499; G01S 17/58; G01S 7/4817; G01S 7/4915; G01S 17/931; G01S 17/86
See application file for complete search history.

(56) References Cited

U.S. PATENT DOCUMENTS

2020/0081106 A1\* 3/2020 Kocaoglu ............... G01S 17/08
2020/0135802 A1\* 4/2020 Rezk ...................... H10B 61/22
(Continued)

OTHER PUBLICATIONS

Zhou et al., Flash Lidar Sensor Using Fiber-Coupled APDs, 2015, IEEE, p. 4758-4768 (Year: 2015).\*
(Continued)

*Primary Examiner* — Mcdieunel Marc
(74) *Attorney, Agent, or Firm* — FOLEY & LARDNER LLP

(57) ABSTRACT

A light detection and ranging (LIDAR) system includes a transmitter, a first receiver, a second receiver, and one or more processors. The transmitter is configured to output a transmit beam. The first receiver is positioned on a first side of the transmitter and is configured to receive a first component of a return beam from reflection of the transmit beam by an object. The second receiver is positioned on a second side of the transmitter and is configured to receive a second component of the return beam. The one or more processors are configured to determine at least one of a range to the object or a velocity of the object and control operation of the autonomous vehicle based on the at least one of the range or the velocity.

20 Claims, 9 Drawing Sheets

(56) References Cited

U.S. PATENT DOCUMENTS

| | | | |
|---|---|---|---|
| 2023/0243977 A1* | 8/2023 | Buoniconti, IV | G01S 7/4817 |
| | | | 356/4.01 |
| 2024/0045034 A1* | 2/2024 | Galloway | G01S 7/4808 |
| 2024/0248184 A1* | 7/2024 | Avci | G01S 7/4911 |

OTHER PUBLICATIONS

Suresh et al., Observation of cloud characteristics using laser radar system, 2012, IEEE, p. 1-4 (Year: 2012).*
Lin et al., Design and Realization of Wide Field-of-View 3D MEMS LIDAR, 2021, IEEE, p. 115-120 (Year: 2021).*
Schindhelm et al., A scanning LIDAR system for active hazard detection and avoidance during landing on Europa, 2018, IEEE, p. 1-7 (Year: 2018).*

* cited by examiner

LIDAR SENSOR SYSTEM USING PARTICULAR SCANNING METHODS

BACKGROUND

Optical detection of range using lasers, often referenced by a mnemonic, LIDAR (for "light detection and ranging"), also sometimes referred to as "laser RADAR," is used for a variety of applications, including imaging and collision avoidance. LIDAR provides finer scale range resolution with smaller beam sizes than conventional microwave ranging systems, such as radio-wave detection and ranging (RADAR).

SUMMARY

At least one aspect relates to a light detection and ranging (LIDAR) system. The LIDAR system includes a laser source configured to generate a beam. The LIDAR system includes a light sensor. The light sensor configured to output a signal based on the beam. The LIDAR system includes an optic module. The optic module configured to collimate the beam. The LIDAR system includes one or more scanning optics. The one or more scanning optics configured to receive the collimated beam from the optic module. The one or more scanning optics configured to output the collimated beam. The LIDAR system includes one or more processors. The one or more processors configured to evaluate an operation condition responsive to the signal.

At least one aspect relates to an autonomous vehicle control system. The autonomous vehicle control system includes a laser source configured to generate a beam. The autonomous vehicle control system includes an optic module. The autonomous vehicle control system includes a mirror positioned between the laser source and the optic module. The mirror configured to receive the beam from the laser source and provide the beam to the optic module. The optic module configured to collimate the beam. The autonomous vehicle control system includes a light sensor coupled with the mirror. The light sensor configured to output a signal based on the beam received by the mirror. The autonomous vehicle control system includes one or more scanning optics configured to receive the collimated beam from the optic module and output the collimated beam. The autonomous vehicle control system includes one or more processors. The one or more processors configured to evaluate an operation condition responsive to the signal. The one or more processors configured to determine at least one of a range to an object or a velocity of the object based on a return beam from reflection of the collimated beam by the object. The one or more processors configured to control operation of at least one of a steering system of an autonomous vehicle or a braking system of the autonomous vehicle based on the at least one of the range or the velocity.

At least one aspect relates to an autonomous vehicle. The autonomous vehicle includes a LIDAR sensor system including a laser source, an optic module, a mirror, a light sensor, one or more scanning optics, and one or more processors. The laser source configured to generate a beam. The mirror positioned between the laser source and the optic module. The mirror configured to receive the beam from the laser source and provide the beam to the optic module. The optic module configured to collimate the beam. The light sensor coupled with the mirror. The light sensor configured to output a signal based on the beam received by the mirror. The one or more scanning optics configured to receive the collimated beam from the optic module and output the collimated beam. The one or more processors configured to evaluate an operation condition responsive to the signal. The one or more processors configured to determine at least one of a range to an object or a velocity of the object based on a return beam from reflection of the collimated beam by the object. The autonomous vehicle includes a steering system, a braking system, and a vehicle controller. The vehicle controller configured to control operation of the at least one of the steering system or the braking system based on the at least one of the range or the velocity.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

A LIDAR sensor system can generate and transmit a light beam that an object can reflect or otherwise scatter as a return beam corresponding to the transmitted beam. The LIDAR sensor system can receive the return beam, and process the return beam or characteristics thereof to determine parameters regarding the object such as range and velocity. The LIDAR sensor system can apply various frequency or phase modulations to the transmitted beam, which can facilitate relating the return beam to the transmitted beam in order to determine the parameters regarding the object.

Systems and methods in accordance with the present disclosure can monitor operation of LIDAR sensor systems during operation. For example, parameters of various beams generated by the LIDAR sensor system, such as power or intensity, can be detected and/or evaluated to determine whether the LIDAR sensor system is in a normal operating condition. This can enable, for example, real-time fault detection and identification of particular components of the LIDAR sensor system that are not operating at expected performance levels. Light sensors can be arranged in the LIDAR sensor system to detect various such parameters in a manner that does not interfere with operation of the LIDAR sensor system. For example, power measurements of the LIDAR sensor system can be detected while the scanning optics are oriented at various angles. A photodiode, for example, can be used as the light sensor and located behind (relative to a direction of output of a transmit beam) a mirror that is part of an optic module. As such, the photodiode can detect the optical power of a beam transmitted, for example, by a collimator or other optics of the optic module. Additionally the photodiode can be behind (in an operational orientation of the LIDAR sensor system) a mirror that is not part of the optic module. As such, the photodiode can detect the optical power transmitted by other optical elements that are part of the LIDAR sensor system. For example, the mirror can receive and reflect a beam transmitted by a laser source. With the photodiode coupled with the mirror, the photodiode can detect the optical power transmitted by the laser source. The advantages of the arrangement described above are not limited to autonomous vehicles. They can be advantageous for any type of vehicles equipped with LIDAR sensors.

1. System Environments for Autonomous Vehicles

Figure 1:
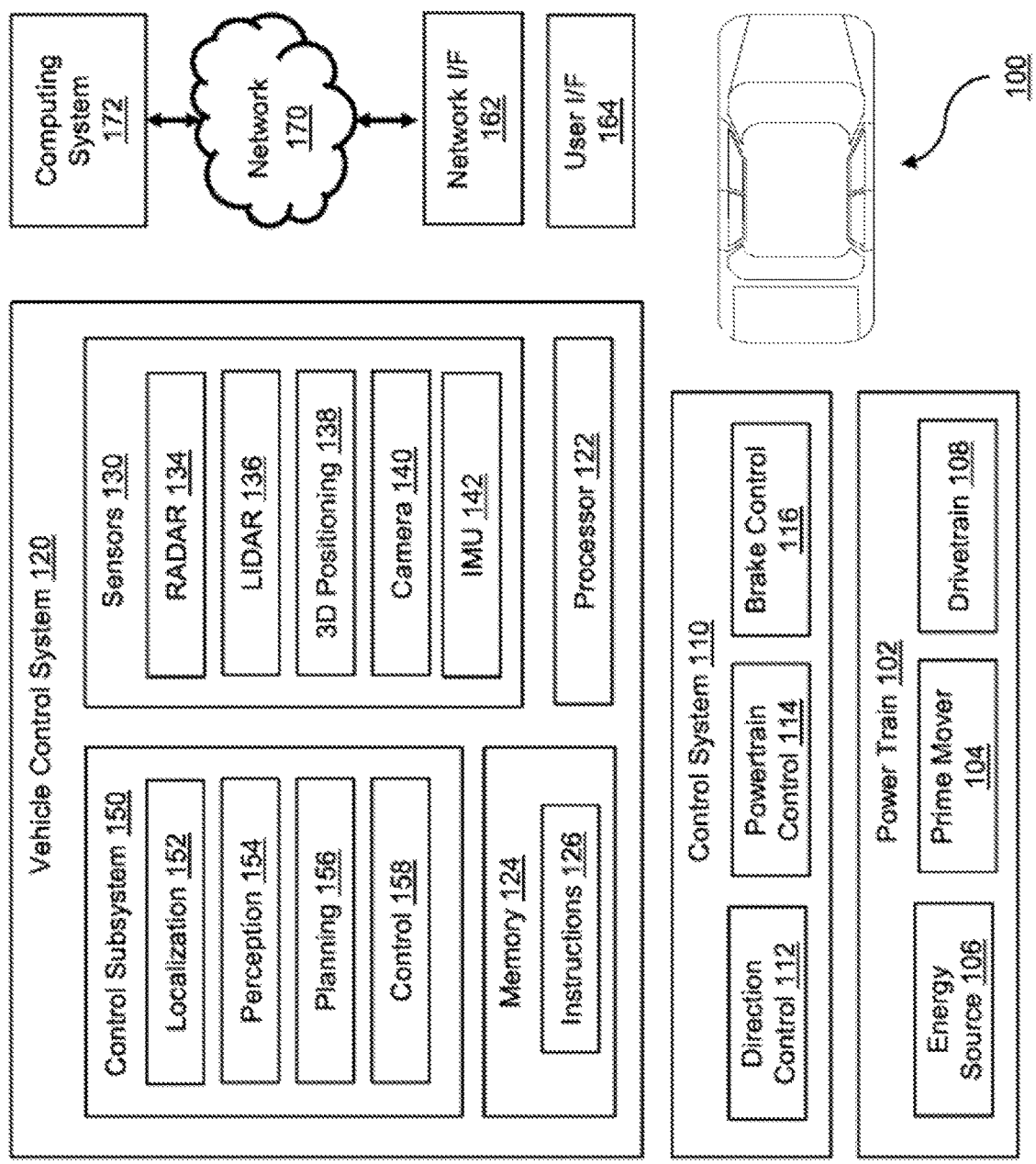
FIG. 1 is a block diagram of an example of a system environment for autonomous vehicles.

FIG. 1 is a block diagram illustrating an example of a system environment for autonomous vehicles according to some implementations. FIG. 1 depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1 can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

Figure 5:
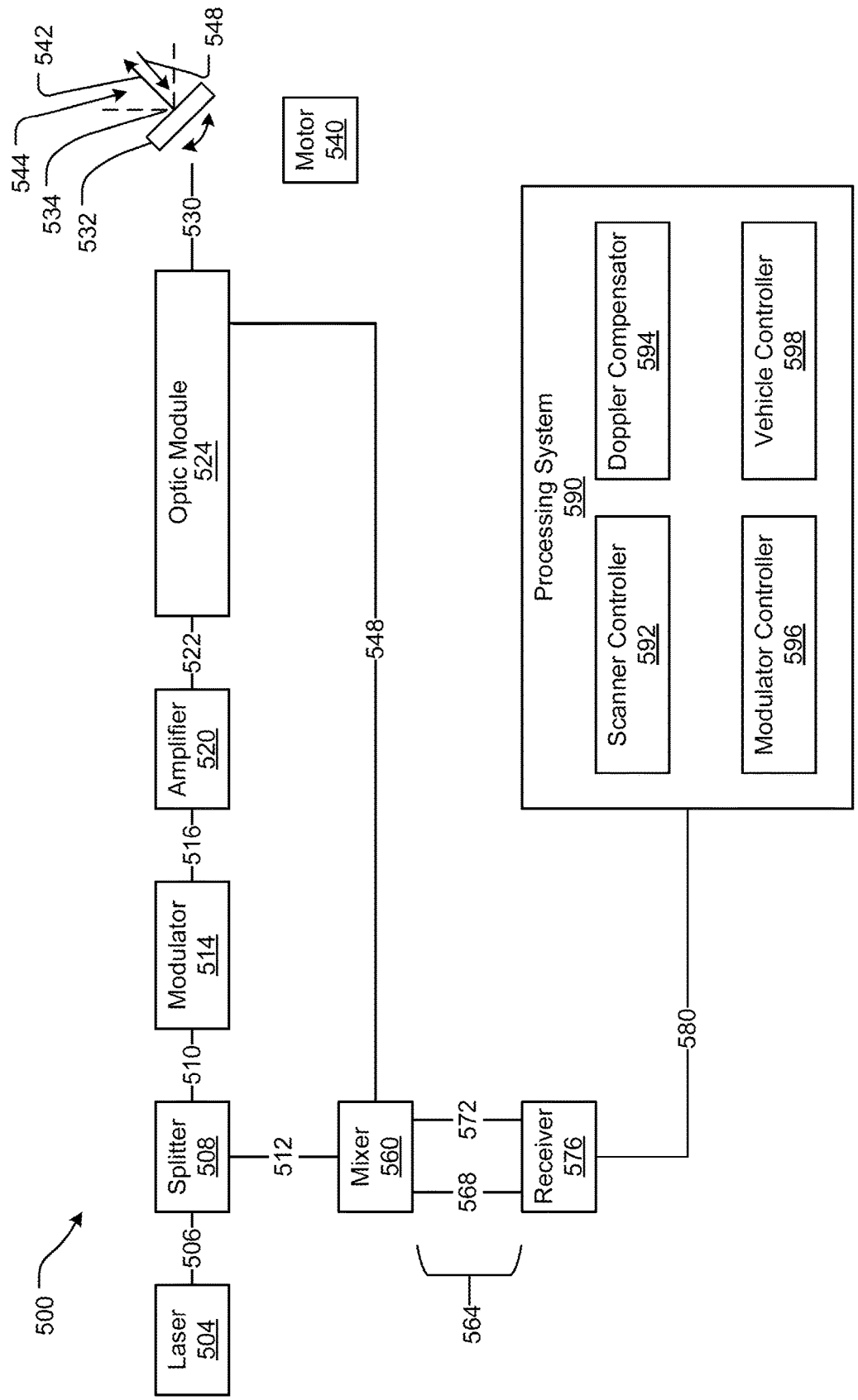
FIG. 5 is a block diagram of an example of a LIDAR sensor system.

A truck can include a LIDAR system (e.g., vehicle control system 120 in FIG. 1, LIDAR sensor system 500 in FIG. 5, among others described herein). In some implementations, the LIDAR sensor system 500 can use frequency modulation to encode an optical signal and scatter the encoded optical signal into free-space using optics. By detecting the frequency differences between the encoded optical signal and a returned signal reflected back from an object, the frequency modulated (FM) LIDAR sensor system can determine the location of the object and/or precisely measure the velocity of the object using the Doppler effect. In some implementations, an FM LIDAR sensor system may use a continuous wave (referred to as, "FMCW LIDAR") or a quasi-continuous wave (referred to as, "FMQW LIDAR"). In some implementations, the LIDAR sensor system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1) of the FM or PM LIDAR sensor system a low amount (e.g., 10% or less) of the light that hit the object. In other instances, an object (e.g., a shiny road sign) may have a high reflectivity (e.g., above 10%), in that it reflects back to the sensors of the FM LIDAR sensor system a high amount of the light that hit the object.

Regardless of the object's reflectivity, an FM LIDAR sensor system may be able to detect (e.g., classify, recognize, discover, etc.) the object at greater distances (e.g., 2×) than a conventional LIDAR sensor system. For example, an FM LIDAR sensor system may detect a low reflectively object beyond 300 meters, and a high reflectivity object beyond 400 meters.

To achieve such improvements in detection capability, the FM LIDAR sensor system may use sensors (e.g., sensors 130 in FIG. 1). In some implementations, these sensors can be single photon sensitive, meaning that they can detect the smallest amount of light possible. While an FM LIDAR sensor system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR sensor system in infrared wavelengths, the FM or PM LIDAR sensor system can broadcast stronger light pulses or light beams than conventional LIDAR sensor systems.

Thus, by detecting an object at greater distances, an FM LIDAR sensor system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR sensor system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR sensor systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR sensor system to determine distant or sparse data points as objects and/or track how those objects are moving over time. For example, an FM LIDAR sensor (e.g., sensors 130 in FIG. 1) may only receive a few returns (e.g., hits) on an object that is 300 m away, but if those return give a velocity value of interest (e.g., moving towards the vehicle at >70 mph), then the FM LIDAR sensor system and/or the autonomous vehicle control system may determine respective weights to probabilities associated with the objects.

Faster identification and/or tracking of the FM LIDAR sensor system gives an autonomous vehicle control system more time to maneuver a vehicle. A better understanding of how fast objects are moving also allows the autonomous vehicle control system to plan a better reaction.

The FM LIDAR sensor system can have less static compared to conventional LIDAR sensor systems. That is, the conventional LIDAR sensor systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR sensor systems often need extra hardware, complex software, and/or more computational power to manage this "noise."

In contrast, FM LIDAR sensor systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR sensor systems produce (e.g., generates, derives, etc.) more accurate data with less hardware or software requirements, enabling smoother driving.

The FM LIDAR sensor system can be easier to scale than conventional LIDAR sensor systems. As more self-driving vehicles (e.g., cars, commercial trucks, etc.) show up on the road, those powered by an FM LIDAR sensor system likely will not have to contend with interference issues from sensor crosstalk. Furthermore, an FM LIDAR sensor system uses less optical peak power than conventional LIDAR sensors. As such, some or all of the optical components for an FM LIDAR can be produced on a single chip, which produces its own benefits, as discussed herein.

2.1 Commercial Trucking

Figure 2:
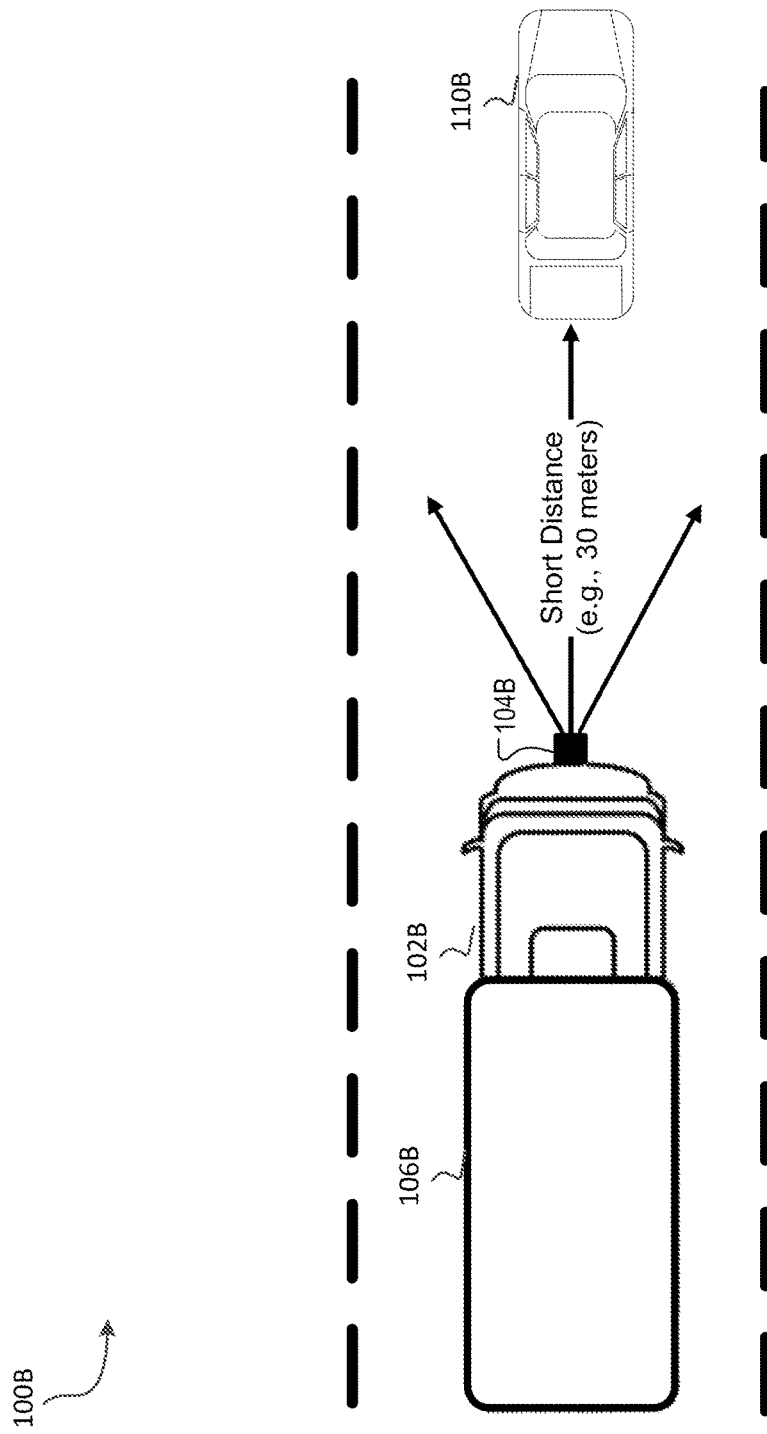
FIG. 2 is a block diagram of an example of a system environment for autonomous commercial trucking vehicles.

FIG. 2 is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 2 as another vehicle) that is within a distance range that is equal to or less than 30 meters from the truck.

The commercial truck 102B may include a LIDAR sensor system 104B (e.g., an FM LIDAR sensor system, vehicle control system 120 in FIG. 1, LIDAR sensor system 500 in FIG. 5) for determining a distance to the object 110B and/or measuring the velocity of the object 110B. Although FIG. 2 shows that one LIDAR sensor system 104B is mounted on the front of the commercial truck 102n, the number of LIDAR sensor system and the mounting area of the LIDAR sensor system on the commercial truck are not limited to a particular number or a particular area. The commercial truck 102B may include any number of LIDAR sensor systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR sensor system 104B in environment 100B may be configured to detect an object (e.g., another vehicle, a bicycle, a tree, street signs, potholes, etc.) at short distances (e.g., 30 meters or less) from the commercial truck 102B.

Figure 3:
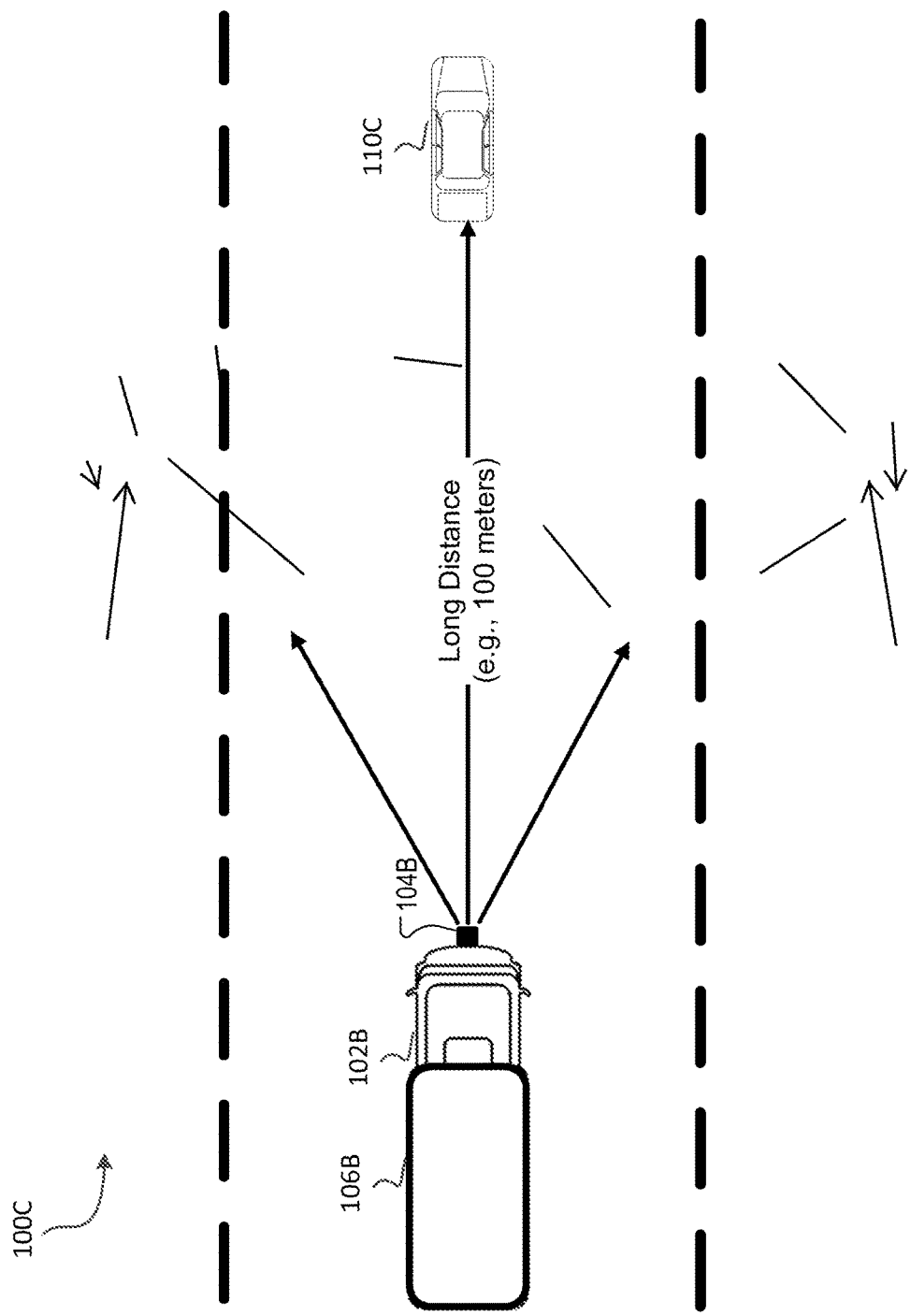
FIG. 3 is a block diagram of an example of a system environment for autonomous commercial trucking vehicles.

FIG. 3 is a block diagram illustrating an example of a system environment for autonomous commercial trucking vehicles, according to some implementations. The environment 100C includes the same components (e.g., commercial truck 102B, cargo 106B, LIDAR sensor system 104B, etc.) that are included in environment 100B.

The environment 100C includes an object 110C (shown in FIG. 3 as another vehicle) that is within a distance range that is (i) more than 30 meters and (ii) equal to or less than 150 meters from the commercial truck 102B. As shown, the LIDAR sensor system 104B in environment 100C may be configured to detect an object (e.g., another vehicle, a bicycle, a tree, street signs, potholes, etc.) at a distance (e.g., 100 meters) from the commercial truck 102B.

Figure 4:
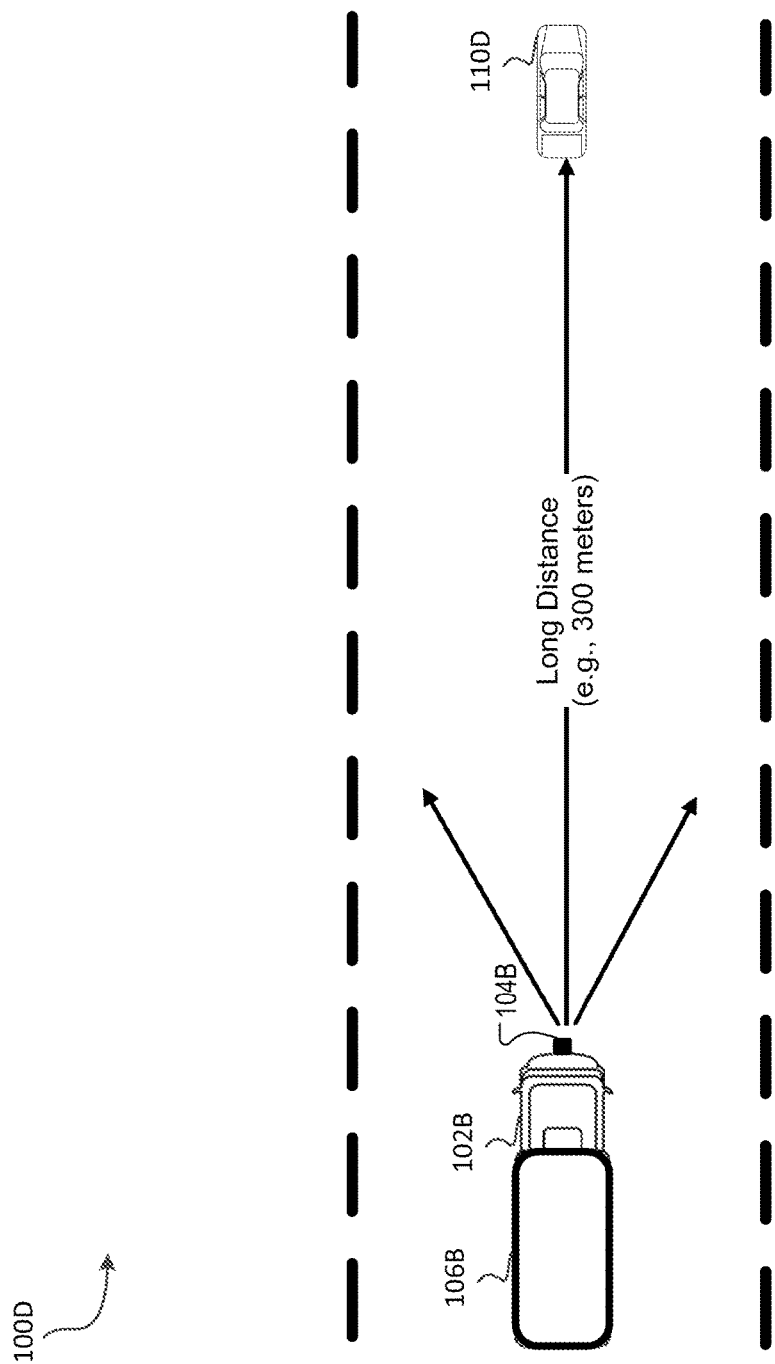
FIG. 4 is a block diagram of an example of a system environment for autonomous commercial trucking vehicles.

FIG. 4 is a block diagram illustrating an example of a system environment for autonomous commercial trucking vehicles, according to some implementations. The environment 100D includes the same components (e.g., commercial truck 102B, cargo 106B, LIDAR sensor system 104B, etc.) that are included in environment 100B.

The environment 100D includes an object 110D (shown in FIG. 4 as another vehicle) that is within a distance range that is more than 150 meters from the commercial truck 102B. As shown, the LIDAR sensor system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR sensor systems (e.g., FMCW and/or FMQW systems) or PM LIDAR sensor systems are well-suited for commercial trucking applications due to the advantages described above. As a result, commercial trucks equipped with such systems may have an enhanced ability to move both people and goods across short or long distances. In various implementations, such FM or PM LIDAR sensor systems can be used in semi-autonomous applications, in which the commercial truck has a driver and some functions of the commercial truck are autonomously operated using the FM or PM LIDAR sensor system, or fully autonomous applications, in which the commercial truck is operated entirely by the FM or LIDAR sensor system, alone or in combination with other vehicle systems.

3. LIDAR Sensor Systems

FIG. 5 depicts an example of a LIDAR sensor system 500. The LIDAR sensor system 500 can be used to determine parameters regarding objects, such as range and velocity, and output the parameters to a remote system. For example, the LIDAR sensor system 500 can output the parameters for use by a vehicle controller that can control operation of a vehicle responsive to the received parameters (e.g., vehicle controller 598) or a display that can present a representation of the parameters. The LIDAR sensor system 500 can be a coherent detection system. The LIDAR sensor system 500 can be used to implement various features and components of the systems described with reference to FIGS. 1-4. The LIDAR sensor system 500 can include components for performing various detection approaches, such as to be operated as an amplitude modular LIDAR system or a coherent LIDAR system. The LIDAR sensor system 500 can be used to perform time of flight range determination. In some implementations, various components or combinations of components of the LIDAR sensor system 500, such as laser source 504 and modulator 514, can be in a same housing, provided in a same circuit board or other electronic component, or otherwise integrated. In some implementations, various components or combinations of components of the LIDAR sensor system 500 can be provided as separate components, such as by using optical couplings (e.g., optical fibers) for components that generate and/or receive optical signals, such as light beams, or wired or wireless electronic connections for components that generate and/or receive electrical (e.g., data) signals. Various components of the LIDAR sensor system 500 can be arranged with respect to one another such that light (e.g., beams of light) between the components is directed through free space, such as a space provided by an air (or vacuum) gap, a space that is not through an optical fiber, a space that is free of structural components around a path along which the light is directed (e.g., an empty space at least on the order of millimeters away from a direct line path between the components; an empty space of a size greater than an expected beam width of the light, such as where the light is a collimated beam), or various combinations thereof.

The LIDAR sensor system 500 can include a laser source 504 that generates and emits a beam 506, such as a carrier wave light beam. A splitter 508 can split the beam 506 into a beam 510 and a reference beam 512 (e.g., reference signal). In some implementations, any suitable optical, electronic, or opto-electronic elements can be used to provide the beam 510 and the reference beam 512 from the laser source 504 to other elements.

A modulator 514 can modulate one or more properties of the input beam 510 to generate a beam 516 (e.g., target beam). In some implementations, the modulator 514 can modulate a frequency of the input beam 510 (e.g., optical frequency corresponding to optical wavelength, where $c=\lambda v$, where c is the speed of light, $\lambda$ is the wavelength, and v is the frequency). For example, the modulator 514 can modulate a frequency of the input beam 510 linearly such that a frequency of the beam 516 increases or decreases linearly over time. As another example, the modulator 514 can modulate a frequency of the input beam 510 non-linearly (e.g., exponentially). In some implementations, the modulator 514 can modulate a phase of the input beam 510 to generate the beam 516. However, the modulation techniques are not limited to the frequency modulation and the phase modulation. Any suitable modulation techniques can be used to modulate one or more properties of a beam. Returning to FIG. 5, the modulator 514 can modulate the beam 510 subsequent to splitting of the beam 506 by the splitter 508, such that the reference beam 512 is unmodulated, or the modulator 514 can modulate the beam 506 and provide a modulated beam to the splitter 508 for the splitter 508 to split into a target beam and a reference beam.

The beam 516, which is used for outputting a transmitted signal, can have most of the energy of the beam 506 outputted by the laser source 504, while the reference beam 512 can have significantly less energy, yet sufficient energy to enable mixing with a return beam 548 (e.g., returned light) scattered from an object. The reference beam 512 can be used as a local oscillator (LO) signal. The reference beam 512 passes through a reference path and can be provided to a mixer 560. An amplifier 520 can amplify the beam 516 to output a beam 522.

The LIDAR sensor system 500 can include an optic module 524, which can receive the beam 522. The optic module 524 can be a free space optic. For example, the optic module 524 can include one or more optics (e.g., lenses, mirrors, waveguides, grating couplers, prisms, waveplates) arranged to have a gap (e.g., air gap) between the one or more optics, allowing for free space transmission of light (e.g., rather than all light being coupled between optics by fibers). The optic module 524 can perform functions such as collimating, filtering, and/or polarizing the beam 522 to output a beam 530 to optics 532 (e.g., scanning optics).

Figure 6:
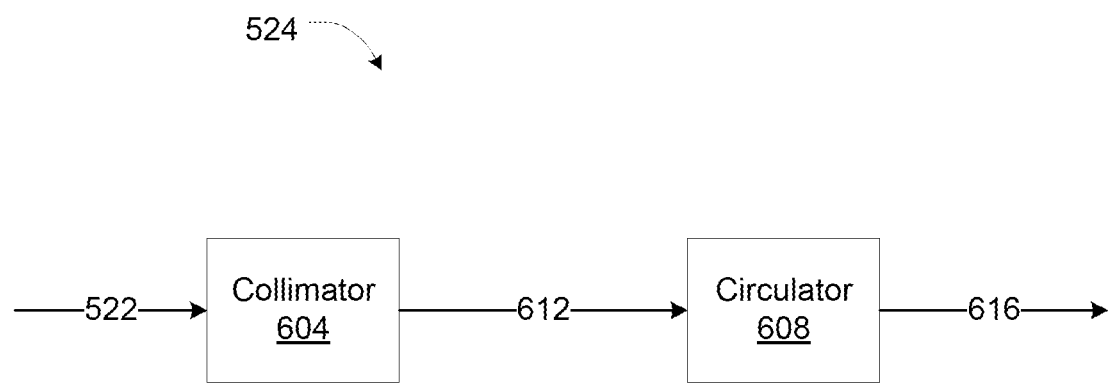
FIG. 6 is a block diagram of an example of an optic module of a LIDAR sensor system.

Referring to FIG. 6, the optic module 524 can include at least one collimator 604 and at least one circulator 608. For example, the circulator 608 can be between the collimator 604 and the optics 532 of FIG. 5. The circulator 608 can receive a collimated beam 612 outputted by the collimator 604 and output a beam 616 (e.g., the beam 530 depicted in FIG. 5) to the optics 532. In some implementations, the circulator 608 can be between the laser source 504 and the collimator 604. At least one of the collimator 604 or the circulator 608 can be free space optics (and can be coupled with one another in free space), such as by being optically coupled via air gaps rather than optical fibers.

Referring further to FIG. 5, the optic module 524 can receive return beam 548 from the optics 532 and provide the return beam 548 to the mixer 560. The optics 532 can be scanning optics, such as one or more steering mirrors or polygon reflectors or deflectors to adjust the angle of received beams relative to outputted beams based on the orientation of outer surfaces (e.g., facets) of the optics relative to the received beam, or solid-state components (e.g., phased arrays, electro-optic crystals) configured to modify the direction of received light.

The optics 532 can define a field of view 544 that corresponds to angles scanned (e.g., swept) by the beam 542 (e.g., a transmitted beam). For example, the beam 542 can be scanned in the particular plane, such as an azimuth plane or elevation plane (e.g., relative to an object to which the LIDAR sensor system 500 is coupled, such as an autonomous vehicle). The optics 532 can be oriented so that the field of view 544 sweeps an azimuthal plane relative to the optics 532.

At least one motor 540 can be coupled with the optics 532 to control at least one of a position or an orientation of the optics 532 relative to the beam 530. For example, where the optics 532 include a mirror, reflector, or deflector, the motor 540 can rotate the optics 532 relative to an axis 534 (e.g., an axis orthogonal to the frame of reference depicted in FIG. 5) so that surfaces of the optics 532 at which the beam 530 is received vary in angle or orientation relative to the beam 530, causing the beam 542 to be varied in angle or direction as the beam 542 is outputted from the optics 532.

The beam 542 can be outputted from the optics 532 and reflected or otherwise scattered by an object (not shown) as a return beam 548 (e.g., return signal). The return beam 548 can be received on a reception path, which can include the circulator 608, and provided to the mixer 560.

The mixer 560 can be an optical hybrid, such as a 90 degree optical hybrid. The mixer 560 can receive the reference beam 512 and the return beam 548, and mix the reference beam 512 and the return beam 548 to output a signal 564 responsive to the reference beam 512 and the return beam 548. The signal 564 can include an in-phase (I) component 568 and a quadrature (Q) component 572.

The LIDAR sensor system 500 can include a receiver 576 that receives the signal 564 from the mixer 560. The receiver 576 can generate a signal 580 responsive to the signal 564, which can be an electronic (e.g., radio frequency) signal. The receiver 576 can include one or more photodetectors that output the signal 580 responsive to the signal 564.

The LIDAR sensor system 500 can include a processing system 590, which can be implemented using features of the vehicle control system 120 described with reference to FIG. 1. The processing system 590 can process data received regarding the return beam 548, such as the signal 580, to determine parameters regarding the object such as range and velocity. The processing system 590 can include a scanner controller 592 that can provide scanning signals to control operation of the optics 532, such as to control the motor 540 to cause the motor 540 to rotate the optics 532 to achieve a target scan pattern, such as a sawtooth scan pattern or step function scan pattern. The processing system 590 can include a Doppler compensator 594 that can determine the sign and size of a Doppler shift associated with processing the return beam 548 and a corrected range based thereon along with any other corrections. The processing system 590 can include a modulator controller 596 that can send one or more electrical signals to drive the modulator 514.

The processing system 590 can include or be communicatively coupled with a vehicle controller 598 to control operation of a vehicle for which the LIDAR sensor system 500 is installed (e.g., to provide complete or semi-autonomous control of the vehicle). For example, the vehicle controller 598 can be implemented by at least one of the LIDAR sensor system 500 or control circuitry of the vehicle. The vehicle controller 598 can control operation of the vehicle responsive to at least one of a range to the object or a velocity of the object determined by the processing system 590. For example, the vehicle controller 598 can transmit a control signal to at least one of a steering system or a braking system of the vehicle to control at least one of speed or direction of the vehicle.

3.1 Monitoring Systems for LIDAR Sensor System

Figure 7:
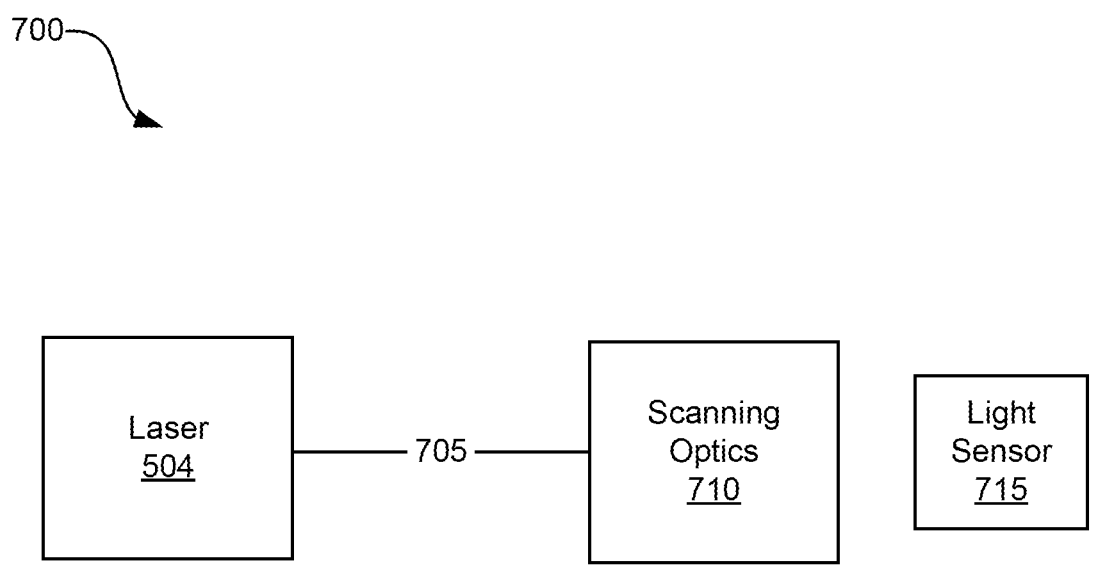
FIG. 7 is a block diagram of an example of a monitoring system of the LIDAR sensor system of FIG. 5.

FIG. 7 depicts a block diagram of an example of a monitoring system 700 that can be implemented for the LIDAR sensor system 500 described with reference to FIGS. 5 and 6. The LIDAR sensor system 500 can include the laser 504. The laser 504 can generate a beam 705 and output the beam 705.

The LIDAR sensor system 500 can include one or more scanning optics 710. The scanning optics 710 can be similar to or the same as the optics 532. For example, the scanning optics 710 can be one or more steering mirrors or polygon reflectors or deflectors to adjust the angle of received beams relative to outputted beams. The scanning optics 710 can define the field of view 544 that corresponds to angles scanned (e.g., swept) by a transmitted beam. The scanning optics 710 can be oriented so that the field of view 544 sweeps an azimuthal plane relative to the scanning optics 710. The scanning optics 710 can receive the beam 705 from the laser 504.

Figure 9:
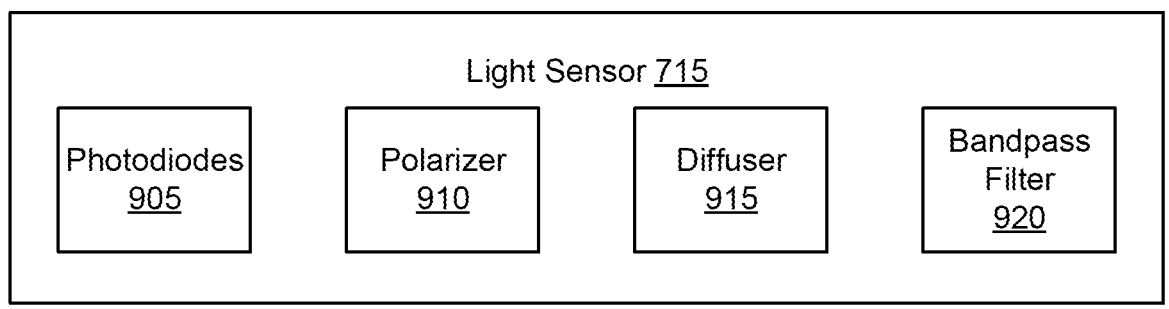
FIG. 9 is a block diagram of an example of a light sensor of a monitoring system of a LIDAR sensor system.

The monitoring system 700 can include at least one light sensor 715. The light sensor 715 can monitor conditions of and provide alerts regarding various components of the LIDAR sensor system 500 in a precise, real-time manner, including by being positioned in particular areas of the LIDAR sensor system 500 that allow for receiving light from particular components of the LIDAR sensor system 500 without substantially affecting operation of the LIDAR sensor system 500, and evaluating particular characteristics of the received light relative to particular thresholds to generate appropriate alerts. Referring to FIG. 9, the light sensor 715 can include one or more photodiodes 905, which can output a signal indicative of one or more parameters of light received by the light sensor 715. The light sensor 715 can include at least one polarizer 910 between the one or more photodiodes 905 and a direction from which the light sensor 715 receives light, which can filter light received at the one or more photodiodes 905 based on a polarization state of the light so that the received light has an expected polarization state (e.g., a polarization state of light to be received at the scanning optics 710). The light sensor 715 can include at least one diffuser 915 between the one or more photodiodes 905 and a direction from which the light sensor 715 receives light, which can scatter the received light to reduce spatial variations which result from factors such as vibration or spatial alignment changes over time. The light sensor 715 can include at least one bandpass filter 920 between the one or more photodiodes 905 and a direction from which the light sensor 715 receives light, so that light passed to the one or more photodiodes 905 is in frequency band corresponding to operation of the LIDAR sensor system 500, such as a frequency band around 1550 nm (e.g., from about 1500 nm to about 1600 nm; from about 1540 nm to about 1560 nm). Various such components can improve the performance of the power measurement by the monitoring system 700 by improving the precision by which the light sensor 715 detects the received light and properties thereof, thus increasing the reliability of the monitoring system 700.

Referring further to FIG. 7, the light sensor 715 (e.g., one or more photodiodes of the light sensor 715) can output an electrical signal having current or voltage based on a power, intensity, or other parameter of the received light. The monitoring system 700 can compare the signal (e.g., a current or voltage of the signal) with a threshold value and determine a state of the LIDAR sensor system 500 responsive to the comparison. For example, the monitoring system 700 can compare the signal with a threshold value associated with a normal power of the beam 705, and determine that the LIDAR sensor system 500 is in a normal operation state responsive to the signal meeting or exceeding the threshold value, or in a fault state responsive to the signal being less than the threshold value.

The light sensor 715 can be positioned in particular locations relative to various components of the LIDAR sensor system 500 useful for detecting power or other parameters of light outputted by the components to determine an operational state of the components. For example, the light sensor 715 can be in a beam dump of the LIDAR sensor system 500. The beam dump can be a location or component of the LIDAR sensor system 500 where light outputted by the laser 504 is directed to other than to the scanning optics 710, such as a surface or component of the LIDAR sensor system 500 that receives light of the beam 705 and that is not the scanning optics 710. For example, the light sensor 715 can be positioned in a beam dump in a field of view of an optical element (e.g., lens, mirror) coupled to a galvonometer of the LIDAR sensor system 500 that directs the beam 705 at various angles towards the scanning optics 710 to enable the scanning optics 710 to output the beam 705 at various angles (e.g., elevation angles). The light sensor 715 can include multiple photodiodes at separate locations associated with the varying direction of the beam output by the galvonometer. The light sensor 715 can include multiple light sensors positioned at multiple points along a light path from the laser 504 to scanning optics 710, such as on opposite sides of optical elements of the LIDAR sensor system 500, to enable a particular component to be identified that may be in a fault state (e.g., responsive to a first light sensor 715 on a first, upstream side of a particular optical element outputting a first signal indicating a normal operating state and a second light sensor 715 on a second, downstream side of the particular optical element outputting a second signal indicating a fault state, the monitoring system 700 can determine that the fault state may be associated with the particular optical element).

The light sensor 715 can be coupled with one or more optics of the LIDAR sensor system 500, such as turning mirror 805 as described with reference to FIG. 8. The light sensor 715 can include or be coupled with a housing that forms an integrating volume structure, such as an integrating sphere. For example, the housing can have an outer surface that is transmissive to the light of the beam 705 to allow the light to enter the housing, and an inner surface that is reflective to the light to allow the light to scatter within the housing and be detected by the light sensor 715. As such, the housing can enable the light sensor 715 to capture a greater amount of the light directed towards the beam dump, and thus have a greater amount of signal to process in order to evaluate operation of the LIDAR sensor system 500.

Figure 8:
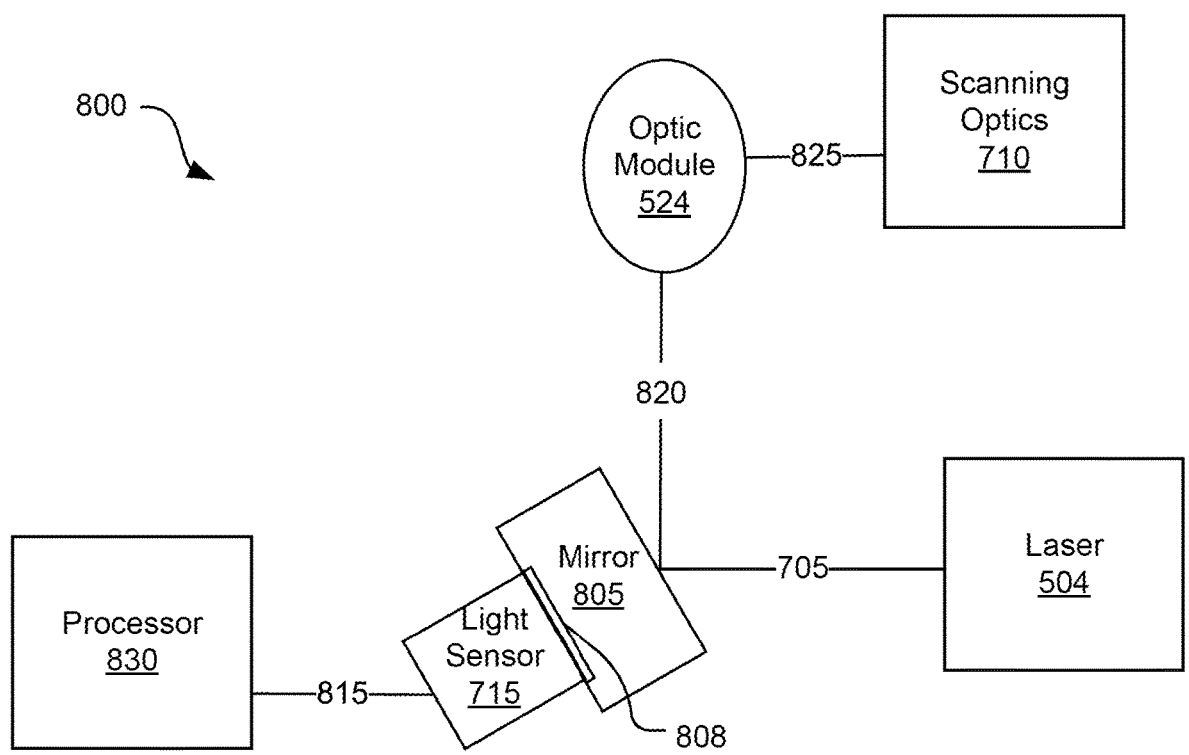
FIG. 8 is a block diagram of an example of a monitoring system of the LIDAR sensor system of FIG. 5.

FIG. 8 depicts an example of a monitoring system 800 that can be implemented for the LIDAR sensor system 500. The monitoring system 800 can incorporate features of the monitoring system 700.

The monitoring system 800 can include at least one mirror 805. The mirror 805 can be a turning mirror to direct the beam 705 from the laser 504 towards optic module 524 and/or scanning optics 710. The mirror 805 can be a component of optic module 524.

The mirror 805 can have a first side to receive the beam 705, and a second side opposite the first side to which the light sensor 715 is coupled. As depicted in FIG. 8, the mirror 805 (e.g., the first side of the mirror 805) can be oriented at a non-orthogonal angle to the direction along which the beam 705 is received. The mirror 805 can be oriented so that beam 705 is reflected by the mirror 805 at a target angle as beam 820. The target angle can be between about 75 degrees and about 105 degrees. The target angle can be between about 85 degrees and about 95 degrees. The target angle can be about 90 degrees. The target angle can be based on positions of the laser 504 and optic module 524.

The mirror 805 can have an aperture 808 on the second side. The aperture 808 can be an opening in the mirror 805 to allow a portion of the beam 705 to be directed to the light sensor 715. The aperture 808 can be a portion of the mirror 805 that is transmissive to the beam 705, while another portion of the beam 705 is reflected by the mirror 805 as beam 820. For example, the mirror 805 can provide the portion of the beam 705 (e.g., between about 0.1% and 1% of the beam 705) to the light sensor 715 through the aperture 808 and a remaining portion of the beam 705 (e.g., between about 99% and 99.9% of the beam 705) to the optic module 524. The optic module 524 can output beam 825 based on the beam 820 to the scanning optics 710. The aperture 808 can extend over at least a portion of the mirror 805 up to the entire surface of the mirror 805; for example, the surface of the mirror 805 on the first side can be substantially or wholly formed as a transparent mirror (or coating with a transparent coating) having a reflectance of the received light greater than about 95 percent and less than 100 percent (e.g., to reflect about 99.4 percent of the received light) while allowing the remainder (e.g., greater than zero percent and less than about 5 percent) of the received light to be passed through the mirror 805 (e.g., through any portion of the mirror 805) to the light sensor 715. As such, the mirror 805 can operate with other components of the LIDAR sensor system 500, such as to operate as a turning mirror, while providing light to the light sensor 715 sufficient for the light sensor 715 to monitor operation of the LIDAR sensor system 500.

Referring further to FIG. 8, the light sensor 715 can output a signal 815. The signal 815 can be indicative of at least one characteristic of the beam 705 detected by the light sensor 715, such as an intensity or power of the beam 705. The light sensor 715 can generate the signal 815 to have a parameter, such as at least one of a current or voltage, indicative of the at least one characteristic.

The light sensor 715 can output the signal 815 to at least one processor 830. The light sensor 715 can include the at least one processor 830, or can be communicatively coupled with the at least one processor 830 by a wired or wireless connection. The at least one processor 830 can be a processor of various processing systems described herein, such as processor 122 of vehicle control system 120, or a separate processor coupled with memory to perform computational operations using the signal 815. The light sensor 715 can periodically provide the signal 815 to the processor 830. The processor 830 can request the signal 815 from the light sensor 715 to sample the signal 815.

The processor 830 can evaluate an operation condition of one or more components of the LIDAR system 500 (or various LIDAR systems described herein that incorporate features of the monitoring system 800) based on the signal 815. The processor 830 can evaluate the operation condition by determining that the operation condition is satisfied (or not satisfied). The operation condition can include or be associated with one or more thresholds indicative of one or more respective states of a component of the LIDAR system 500. For example, the operation condition can include a threshold associated with a fault state of the component. For example, the threshold can be a threshold for at least one of intensity or power of the beam 705 as detected by the light sensor 715, such that the processor 830 can compare the signal 815 (e.g., compare a parameter of the signal 815 indicative of at least one of intensity or power) with the threshold, and determine the component to be in a fault state responsive to the parameter of the signal 815 being less than the threshold or a normal state responsive to the parameter being greater than or equal to the threshold. The processor 830 can generate and output an alert responsive to determining the component to be in the fault state.

The processor 830 can periodically evaluate the operation condition using the signal 815. The processor 830 can evaluate the operation condition using an instantaneous value of a characteristic indicated by the signal 815, or determine various averages of such characteristics, such as average values of power of the beam 705 over a predetermined period of time. The processor 830 can receive or sample the signal 815 at a first rate, and responsive to determining that the signal 815 indicates the component is in a fault state, increase the rate of receiving or sampling the signal 815 to a second rate and evaluate the operation condition for a predetermined period of time at the second rate to confirm the state of the component.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed:

1. A light detection and ranging (LIDAR) sensor system, comprising:
a laser source configured to generate a beam;
a light sensor configured to output a signal based on the beam;
an optic module configured to collimate the beam;
one or more scanning optics configured to receive the collimated beam from the optic module and output the collimated beam; and
one or more processors configured to evaluate an operation condition based on the signal.

2. The LIDAR sensor system of claim 1, comprising:
a mirror positioned between the laser source and the optic module, the mirror configured to receive the beam from the laser source and provide the beam to the optic module.

3. The LIDAR sensor system of claim 1, wherein the light sensor is out of an optical path from the laser source to the one or more scanning optics.

4. The LIDAR sensor system of claim 1, wherein the one or more processors are configured to:
evaluate the operation condition based on the signal by comparing a parameter of the signal with a threshold; and
based on the evaluation, output an alert responsive to the parameter satisfying the threshold.

5. The LIDAR sensor system of claim 4, wherein the parameter is a power of the signal.

6. The LIDAR sensor system of claim 1, wherein the one or more processors are configured to determine at least one of a range to an object or a velocity of the object based on a return beam from reflection of the collimated beam by the object.

7. The LIDAR sensor system of claim 1, comprising:
a mirror transmissive to the beam, the mirror aligned with reference to a path of the beam, the light sensor coupled to the mirror.

8. The LIDAR sensor system of claim 1, comprising:
a mirror positioned between the laser source and the optic module, the mirror is configured to change a direction of the beam by between about 85 degrees and about 95 degrees, wherein the laser source is coupled to the mirror.

9. The LIDAR sensor system of claim 1, comprising:
a mirror comprising a first side to receive the beam and a second side opposite the first side, the light sensor coupled to the second side.

10. The LIDAR sensor system of claim 1, wherein the light sensor comprises a photodiode.

11. The LIDAR sensor system of claim 1, comprising:
a mirror comprising an aperture, the light sensor to receive the beam through the aperture.

12. An autonomous vehicle control system, comprising:
a laser source configured to generate a beam;
an optic module;

a mirror between the laser source and the optic module, the mirror configured to receive the beam from the laser source and provide the beam to the optic module, the optic module configured to collimate the beam;

a light sensor coupled with the mirror, the light sensor configured to output a signal based on the beam received by the mirror;

one or more scanning optics configured to receive the collimated beam from the optic module and output the collimated beam; and one or more processors configured to:
  evaluate an operation condition responsive to the signal;
  determine at least one of a range to an object or a velocity of the object based on a return beam from reflection of the collimated beam by the object; and
  control operation of at least one of a steering system of an autonomous vehicle or a braking system of the autonomous vehicle based on the at least one of the range or the velocity.

13. The autonomous vehicle control system of claim 12, wherein the one or more processors are configured to:
  evaluate the operating condition by comparing a parameter of the signal with a threshold; and
  based on the evaluation, output an alert responsive to the parameter satisfying the threshold.

14. The autonomous vehicle control system of claim 13, wherein the parameter is a power of the signal.

15. The autonomous vehicle control system of claim 12, wherein the mirror is transmissive to the beam.

16. The autonomous vehicle control system of claim 12, wherein the mirror is oriented to change a direction of the beam by between about 85 degrees and about 95 degrees.

17. The autonomous vehicle control system of claim 12, wherein the mirror comprises a first side to receive the beam and a second side opposite the first side, the light sensor mounted to the second side.

18. The autonomous vehicle control system of claim 12, wherein:
  the light sensor comprises a photodiode; and
  the mirror comprises an aperture, the photodiode to receive the beam through the mirror.

19. The autonomous vehicle control system of claim 12, wherein the one or more processors are configured to control operation of the at least one of the steering system or the braking system to avoid collision with the object.

20. An autonomous vehicle, comprising:
  a LIDAR sensor system, comprising:
    a laser source configured to generate a beam;
    an optic module;
    a mirror positioned between the laser source and the optic module, the mirror configured to receive the beam from the laser source and provide the beam to the optic module, the optic module configured to collimate the beam;
    a light sensor coupled with the mirror, the light sensor configured to output a signal based on the beam received by the mirror;
    one or more scanning optics configured to receive the collimated beam from the optic module and output the collimated beam; and
    one or more processors configured to evaluate an operation condition responsive to the signal; and
  a steering system;
  a braking system; and
  a vehicle controller configured to:
    determine at least one of a range to an object or a velocity of the object based on a return beam from reflection of the collimated beam by the object; and
    control operation of the at least one of the steering system or the braking system based on the at least one of the range or the velocity.

* * * * *